United States Patent
Herder et al.

(10) Patent No.: US 9,597,795 B2
(45) Date of Patent: Mar. 21, 2017

(54) SYSTEM FOR MOVING A MOBILE TENDON CONTROLLED PLATFORM ROBOT

(71) Applicant: Metiss B.V., Saasveld (NL)

(72) Inventors: Justus Laurens Herder, The Hague (NL); Volkert Van Der Wijk, Enschede (NL); Kevin Hendrik Jozef Voss, Hengelo (NL)

(73) Assignee: METISS B.V., Saasvekd (NL)

( * ) Notice: Subject to any disclaimer, the term of this patent is extended or adjusted under 35 U.S.C. 154(b) by 51 days.

(21) Appl. No.: 14/657,699

(22) Filed: Mar. 13, 2015

(65) Prior Publication Data

US 2015/0183111 A1 Jul. 2, 2015

Related U.S. Application Data

(63) Continuation of application No. PCT/NL2013/050638, filed on Sep. 5, 2013.

(30) Foreign Application Priority Data

Sep. 17, 2012 (NL) ...................................... 2009478

(51) Int. Cl.
  *F04D 15/00* (2006.01)
  *B25J 9/00* (2006.01)
  *B25J 5/00* (2006.01)

(52) U.S. Cl.
  CPC ............... *B25J 9/0078* (2013.01); *B25J 5/00* (2013.01)

(58) Field of Classification Search
  CPC .... B63B 21/50; B65H 23/198; B65H 23/1955
  USPC .......................................................... 318/3, 6
  See application file for complete search history.

(56) References Cited

U.S. PATENT DOCUMENTS

| | | | |
|---|---|---|---|
| 3,638,600 A | 2/1972 | Modrey | |
| 4,666,362 A * | 5/1987 | Landsberger | B25J 9/0078 212/239 |
| 5,585,707 A | 12/1996 | Thompson et al. | |
| 5,997,218 A * | 12/1999 | Børseth | B63B 9/065 405/223.1 |
| 6,780,072 B1 * | 8/2004 | de Almeida | B63B 21/50 441/4 |
| 7,267,240 B2 * | 9/2007 | Maurer | B66C 13/063 212/270 |
| 2004/0161984 A1* | 8/2004 | Lima de Almeida | B63B 21/50 441/4 |
| 2012/0043162 A1 | 2/2012 | Kim et al. | |

FOREIGN PATENT DOCUMENTS

| | | |
|---|---|---|
| WO | 95/23053 | 8/1995 |
| WO | 2011/148004 | 12/2011 |
| WO | 2014/042522 | 3/2014 |

\* cited by examiner

*Primary Examiner* — Rina Duda
(74) *Attorney, Agent, or Firm* — Peacock Myers, P.C.; Jeffrey Myers

(57) ABSTRACT

System for moving a mobile tendon controlled platform robot, comprising a mobile platform, at least one drive and at least one tendon connected to the mobile platform, wherein the relative position of the at least one tendon with respect to the mobile platform is controllable with the at least one drive, and wherein the at least one tendon is enabled to move without chafing past a surface of an object external to the mobile tendon controlled platform robot.

9 Claims, 5 Drawing Sheets

SYSTEM FOR MOVING A MOBILE TENDON CONTROLLED PLATFORM ROBOT

CROSS-REFERENCE TO RELATED APPLICATIONS

This application is a continuation application of Patent Cooperation Treaty Application No. PCT/NL2013/050638, entitled "System for Moving a Mobile Tendon Controlled Platform Robot", filed on Sep. 5, 2013, which claimed priority to Netherlands Patent Application No. 2009478, filed on Sep. 17, 2012, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to a system for moving a mobile tendon controlled platform robot, comprising a mobile platform, at least one drive means and at least one tendon connected to the mobile platform, wherein the relative position of the at least one tendon with respect to the mobile platform is controllable with the at least one drive means. The word "tendon" as used in relation to the invention can relate to any type of flexible cord or member.

Description of Related Art

Such a system is known from WO95/23053 and from US2012/0043162. In the known system the mobile tendon con-trolled platform robot operates within a confined workspace and with plural tendons. The tendons then extend from anchor points in selected corners of the confined workspace to motor driven spools, reels or winches that are located on the mobile platform. By a controlled driving of the spools or winches the mobile platform can be accurately positioned within the confined workspace. An end effector mounted on the platform may carry out a specific task, such as grasping loose articles or holding and manipulating a tool.

US2012/0043162 specifically mentions the operations of welding, blasting and painting which need to be performed inside a block, wherein the block is surrounded by structures such as partition walls and stiffeners as are present in the hull of a ship. Such a mobile tendon controlled platform robot can also be used to carry out operations on the outside of the ship, notably on the convex hull. To avoid that while the mobile platform is moved the tendons damage the ship's hull, the anchor points for the tendons are placed distant from the ship. This has notable disadvantages considering that the tendons restrict the freedom of movement of other equipment near to the ship and is aesthetically undesirable. Furthermore controlling the mobile platform accurately requires eight cables and a complicated control unit. Also the tendons are relatively long considering the distant placement of the anchor points and therefore prone to vibration, in part caused by wind. With long distances it is also difficult to maintain a straight connection of the tendons between the anchor points and the robot, which makes accurate positioning difficult.

Similar problems exist when the mobile tendon controlled platform is applied for operations on other types of objects having a surface with a curvature. An object of the invention is therefore to propose a system for moving a mobile tendon controlled platform in which the aforementioned problems are alleviated or addressed.

U.S. Pat. No. 3,638,600 teaches a system according to the preamble, wherein at least one tendon is provided that is slidably encased in a nylon tubing for most of the tendon's length to enable the tendon to move without chafing past a surface of an object.

BRIEF SUMMARY OF THE INVENTION

In accordance with the invention a system for moving a mobile tendon controlled platform is proposed having the features of one or more of the appended claims.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
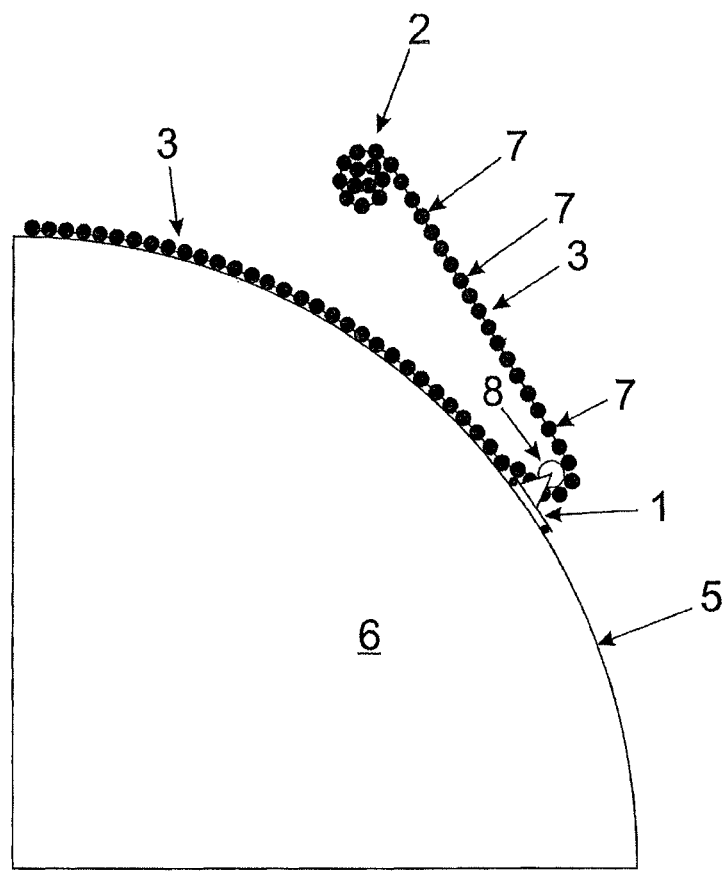
FIG. 1 is shows a first embodiment of the system of the invention operating with a single tendon and a drive means external of the mobile platform.

In a first aspect of the invention a system is proposed for moving a mobile tendon controlled platform wherein at least one drive means and at least one tendon are connected to the mobile platform, and wherein the relative position of the at least one tendon with respect to the mobile platform is controllable with the at least one drive means, and in which the at least one tendon is provided with means to enable the tendon to move without chafing past a surface of an object that are selected from the group comprising a) tubes that are rotatably provided around the at least one tendon so as to arrange that said tubes rotate during movement of the at least one tendon past the surface transverse to its longitudinal direction, b) beads that are rotatably provided around the at least one tendon, and c) an external friction lowering coating provided on the at least one tendon.

Such tubes and/or beads are very cost efficient and reliable means to prevent that the tendons may chafe during their transversal movement along the surface of the object. The length of the tubes and shape of the beads can be elected freely as long as they are rotatably provided around the at least one tendon and serve the invention's purpose. The measure that the tendon is at least in part provided with an external friction lowering coating promotes that damage to the surface of the object due to chafing is avoided.

Normally the object is external to the mobile tendon controlled platform robot. With this arrangement of the invention it is enabled to mount the anchor points for the tendons close by or even on the very object along the surface of which the mobile platform is moved. This practically eliminates the problems that are associated with the conventional application of the mobile platform when the anchor points are placed distant from the object.

Although the prior art embodied by WO95/23053 and US2012/00431624 teaches that the drive means or drives are placed on the mobile platform, this is not a requirement in the system of the invention. In a particular embodiment the at least one drive means is external from the mobile platform. In this embodiment a guide reel may be mounted on the mobile platform, around which guide reel the at least one tendon is guided, wherein the at least one tendon connects directly or indirectly to the at least one drive means such that actuation of said drive means results in relative movement of the at least one tendon and the mobile platform. Preferably for this purpose the at least one drive means connects to a winch for storing and/or re-leasing of the at least one tendon.

In another embodiment the at least one drive means is mounted on the mobile platform and connected to a device selected from the group comprising a winch, and (frictional) engagement means, which selected device is in contact with the at least one tendon so as to arrange that actuation of the at least one drive means results in relative movement of the at least one tendon and the mobile platform. This embodiment can suitably be implemented such that there is only a single tendon.

In another embodiment there are two tendons and two drive means, wherein each tendon cooperates with a device individual to such tendon and selected from the group comprising a winch, and (frictional) engagement means, which selected device is in contact with its concerning tendon so as to arrange that actuation of the concerning drive means that is operably connected to the selected device results in relative movement of the concerning tendon and the mobile platform.

In still another embodiment there are four tendons and four drive means operably connected to winches mounted on the mobile platform so as to arrange that actuation of a drive means that is operably connected to a winch results in relative movement of the tendon connected to the concerning winch and the mobile platform.

It will be clear that the invention is not restricted to a particular number of tendons; in fact the invention requires only that there is at least one tendon. There may therefore also be five or six, or any other suit-able number of tendons.

The invention will hereinafter be further elucidated with reference to the drawing schematically showing the system of the invention in different embodiments. It is to be noted that these schematic examples are not restrictive as to the claims, and are provided merely to elucidate the concept of the invention.

Wherever in the figures the same reference numerals are applied, these numerals refer to the same parts.

Common to all embodiments of the system of the invention is a mobile platform 1, at least one drive means 2 and at least one tendon 3 connected to the mobile platform 1, wherein the relative position of the at least one tendon 3 with respect to the mobile platform 1 is controllable with the at least one drive means 2, and the at least one tendon 3 is provided with means to enable the tendon 3 to move without chafing past a surface 5 of an object 6. In this example the object 6 is external to the mobile tendon controlled platform robot 1. The means to enable the tendon 3 to move without chafing past the surface 5 are embodied as tubes or beads 7 that are rotatably provided around the at least one tendon 3. It is also possible that the tendon 3 is at least in part provided with an external friction lowering coating.

FIG. 1 shows the embodiment in which a drive means 2 is external from the mobile platform 1. In this embodiment a guide reel 8 is mounted on the mobile platform 1 around which guide reel 8 a tendon 3 is guided. The tendon 3 connects either directly or indirectly to the drive means 2 such that actuation of said drive means 2 results in relative movement of the tendon 3 and the mobile platform 1. If there is an indirect connection to the drive means 2 this may be implemented in that the drive means 2 connects to a winch, reel or spool for storing and/or releasing of the tendon 3.

Figure 2:
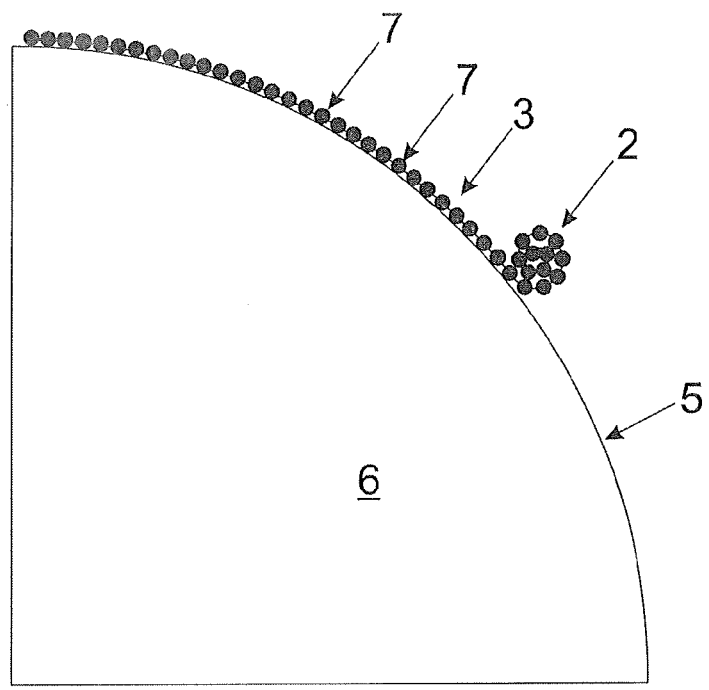
FIG. 2 shows a second embodiment of the system of the invention operating with a single tendon and a drive means mounted on the mobile platform.
Figure 2:
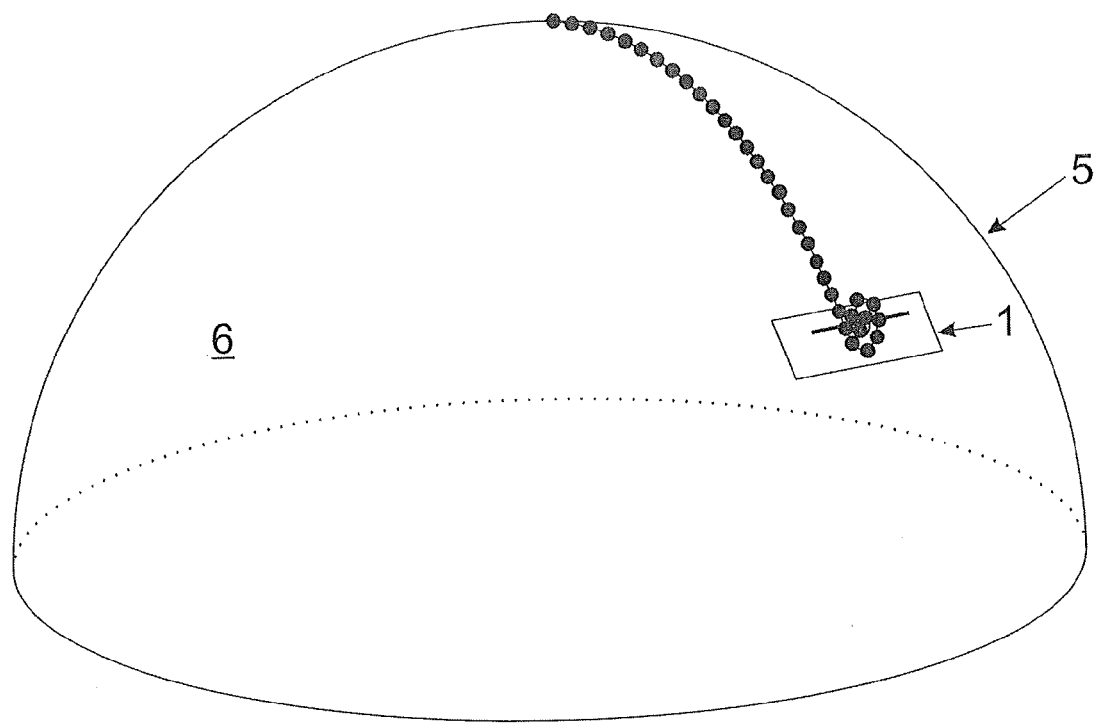

FIG. 2 shows the embodiment in which one drive means 2 is mounted on the mobile platform 1 and the tendon 3 is connected to a winch, reel or spool, so as to arrange that actuation of the drive means 2 results in relative movement of the tendon 3 and the mobile platform 1. As is the case in the embodiment of FIG. 1, the embodiment of FIG. 2 is arranged with a single tendon 3. This is also the case in the embodiment of FIGS. 3A/3B.

Figure 3A:
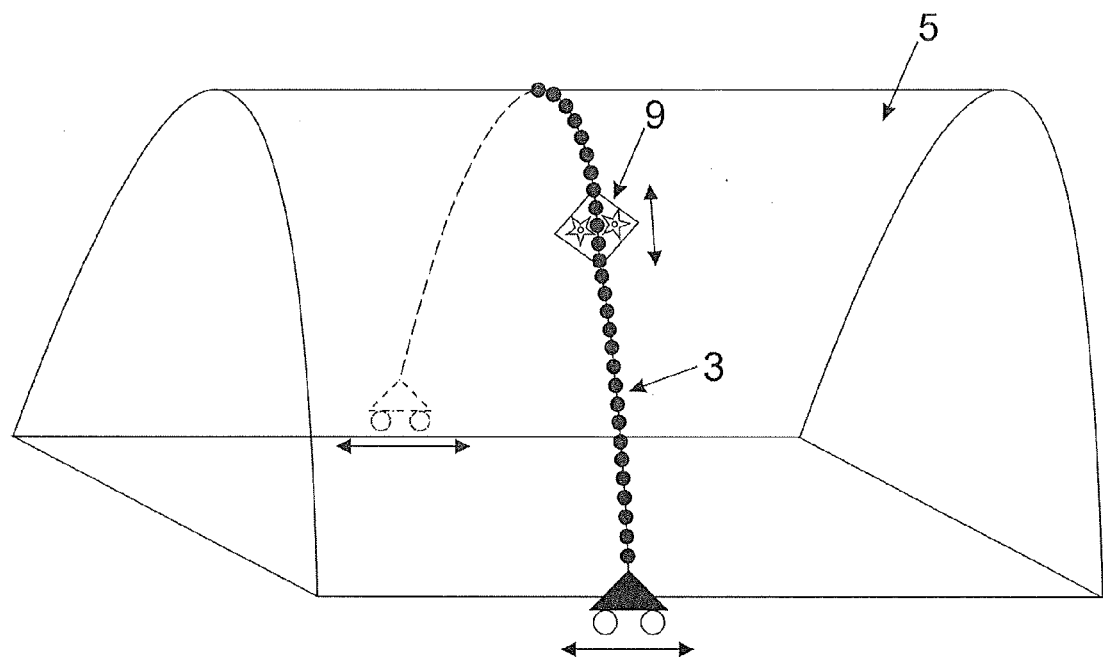
FIGS. 3A and 3B show a third embodiment of the system of the invention operating with a single tendon and a drive means mounted on the mobile platform.
Figure 3B:
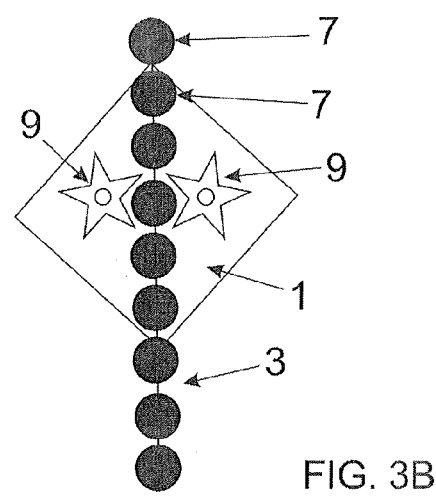

In FIG. 3A an embodiment is shown in which a drive means (not shown) is or are mounted on the mobile platform 1 and connected to engagement means 9. The engagement means can be implemented as frictional engagement means, which in the example shown are embodied as star shaped wheels. In the detail of FIG. 3B is clearly shown that these engagement means 9 are in contact with the single tendon 3 so as to arrange that actuation of the drive means results in relative movement of the tendon 3 and the mobile platform 1.

Figure 4A:
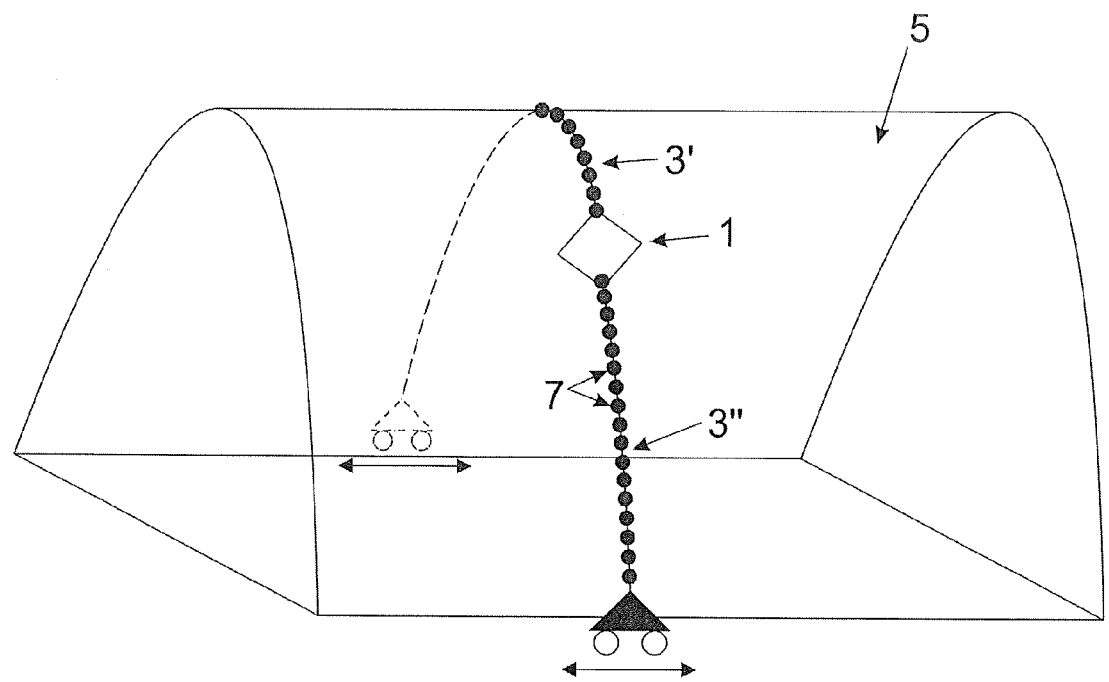
FIGS. 4A and 4B show a fourth embodiment of the system of the invention operating with two tendons and drive means mounted on the mobile platform.
Figure 4B:
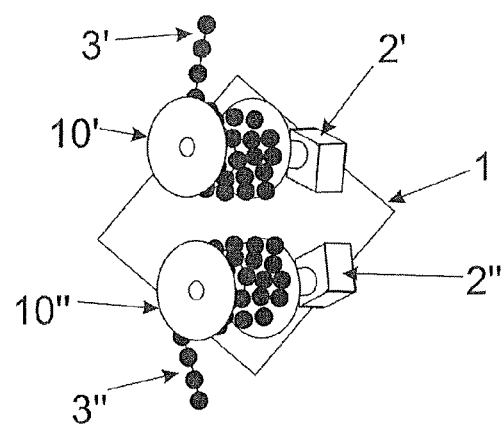

Yet another embodiment is shown in FIGS. 4A and 4B. FIGS. 4A and 4B show the embodiment in which there are two tendons 3', 3" and two drive means 2', 2"; see in particular FIG. 4B. Each tendon 3', 3" cooperates with a winch 10', 10" or another suitable device individual to such tendon 3', 3". This device may be selected from the group comprising a winch (as is shown in FIG. 4B), a reel, a spool and (frictional) engagement means. If frictional engagement means are selected means as are shown in the embodiment of FIG. 3A and FIG. 3B may be employed. The eventually selected device (winch, reel, spool or (frictional) engagement means) is in contact with the concerning tendon 3', 3" so as to arrange that actuation of the concerning drive means 2', 2" that is operably connected to the selected device (such as the shown winches 10', 10") results in relative movement of the concerning tendon 3', 3" and the mobile platform 1.

Figure 5A:
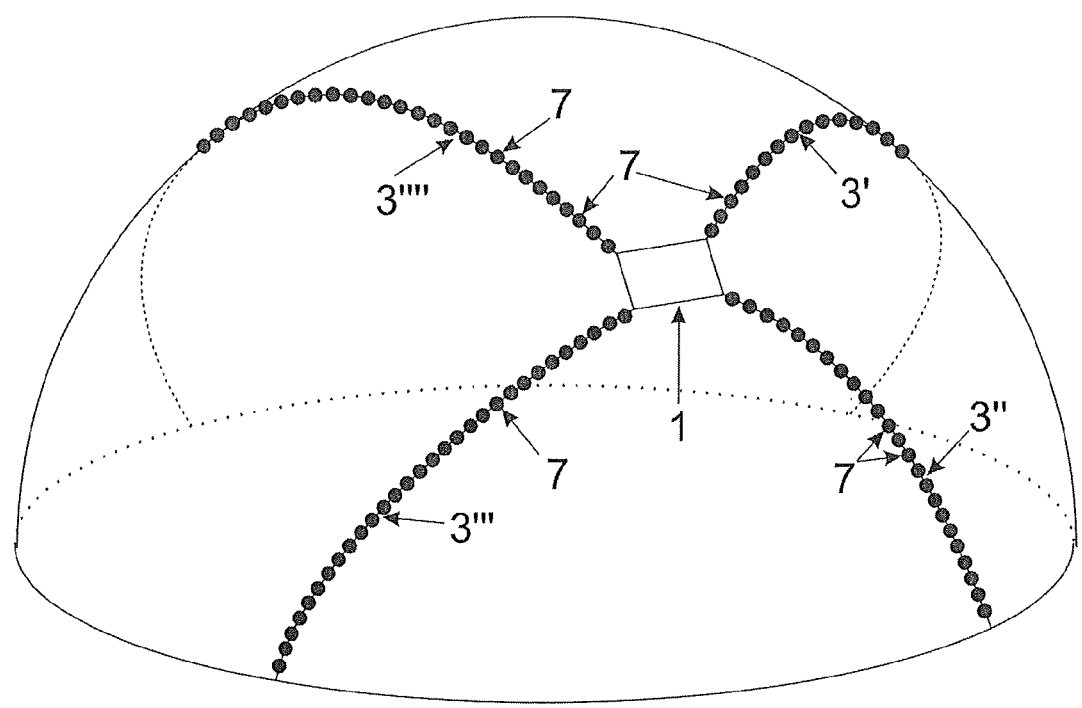
FIGS. 5A and 5B show a fifth embodiment of the system of the invention operating with four tendons and drive means mounted on the mobile platform.
Figure 5B:
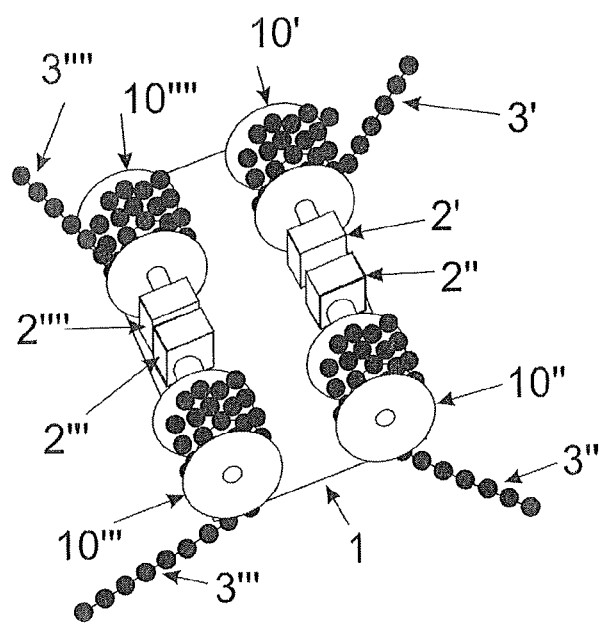

FIGS. 5A and 5B finally show an embodiment in which there are four tendons 3', 3", 3''', 3'''' and four drive means 2', 2", 2''', 2'''' operably connected to winches 10', 10", 10''', 10'''' mounted on the mobile platform 1 so as to arrange that actuation of a drive means 2', 2", 2''', 2'''' that is operably connected to a winch 10', 10", 10''', 10'''' results in relative movement of the tendon 3', 3", 3''', 3'''' connected to the concerning winch 10', 10", 10''', 10'''' and the mobile platform 1. Again instead of the winches also reels or spools, or frictional engagement means as employed in the embodiment shown in FIGS. 3A and 3B may be applied.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system for moving a mobile tendon controlled platform robot, comprising a mobile platform, at least one drive means and at least one tendon connected to the mobile platform, wherein the relative position of the at least one tendon with respect to the mobile platform is controllable with the at least one drive means, wherein the at least one tendon is provided with means to enable the tendon to move without chafing past a surface of an object, wherein said means to enable the tendon to move without chafing past a surface are selected from the group comprising a) tubes that are rotatably provided around the at least one tendon so as to arrange that said tubes rotate during movement of the at least one tendon past the surface transverse to its longitudinal direction, b) beads that are rotatably provided around the at least one tendon, and c) an external friction lowering coating provided on the at least one tendon.

2. The system for moving a mobile tendon controlled platform robot according to claim 1, wherein said means to enable the tendon to move without chafing past a surface are beads that are rotatably provided around the at least one tendon.

3. The system for moving a mobile tendon controlled platform robot according to claim 1, characterized in that one or more of the at least one tendon is at least in part provided with an external friction lowering coating.

4. The system for moving a mobile tendon controlled platform robot according to claim 1, wherein the at least one drive means is external from the mobile platform and on the mobile platform a guide reel is mounted around which the at least one tendon is guided, and said at least one tendon connects directly or indirectly to the at least one drive means such that actuation of said drive means results in relative movement of the at least one tendon and the mobile platform.

5. The system for moving a mobile tendon controlled platform robot according to claim 4, wherein the at least one drive means connects to a winch, reel or spool for storing and/or releasing of the at least one tendon.

6. The system for moving a mobile tendon controlled platform robot according to claim 1, wherein the at least one drive means is mounted on the mobile platform and connected to a device selected from the group comprising a winch, a reel, a spool, and preferably frictional engagement means, which selected device is in contact with the at least one tendon so as to arrange that actuation of the at least one drive means results in relative movement of the at least one tendon and the mobile platform.

7. The system for moving a mobile tendon controlled platform robot according to claim 6, wherein there is a single tendon.

8. The system for moving a mobile tendon controlled platform robot according to claim 6, wherein there are two tendons and two drive means, and wherein each tendon cooperates with a device individual to such tendon and selected from the group comprising a winch, a reel, a spool and preferably frictional engagement means, which selected device is in contact with its concerning tendon so as to arrange that actuation of the concerning drive means that is operably connected to the selected device results in relative movement of the concerning tendon and the mobile platform.

9. The system for moving a mobile tendon controlled platform robot according to claim 6, wherein there are four tendons and four drive means operably connected to winches, reels or spools mounted on the mobile platform so as to arrange that actuation of a drive means that is operably connected to a winch, reel or spool results in relative movement of the tendon connected to the concerning winch, reel or spool and the mobile platform.

\* \* \* \* \*